UNITED STATES PATENT OFFICE.

RUDOLF SCHENCK, OF MARBURG, AND PAUL MARQUART, OF CASSEL, GERMANY, ASSIGNORS TO THE FIRM OF CHEMISCHE FABRIK BETTENHAUSEN MARQUART & SCHULZ, OF BETTENHAUSEN-CASSEL, GERMANY.

PROCESS OF MAKING RED PHOSPHORUS.

No. 804,555.   Specification of Letters Patent.   Patented Nov. 14, 1905.

Application filed December 15, 1902. Serial No. 135,333.

*To all whom it may concern:*

Be it known that we, RUDOLF SCHENCK, a resident of 29 Renthof, Marburg, and PAUL MARQUART, a resident of 50$^b$ Cölnischestrasse, Cassel, in the Province of Hesse-Nassau, German Empire, subjects of the King of Prussia, German Emperor, have jointly invented an Improved Process of Making Bright-Red Phosphorus, of which the following is an exact specification.

Our invention relates to an improved process of manufacturing amorphous or red phosphorus, and has for its object to provide a process by means of which this phosphorus is obtained in a very pure finely-divided-up state, in which state it looks very light red and is very easily capable of reacting.

It is well known that the so-called "amorphous" or "red" phosphorus is hitherto manufactured by heating white phosphorus either with or without the addition of catalytically-acting compounds. The amorphous phosphorus thus obtained is of a hard glassy structure and must be triturated before using the same. The capability of reacting is therefore relatively small and the reaction can never be perfectly carried through. The poisonous white phosphorus still contained in the product must afterward be removed in a very troublesome manner and the result is mostly a very incomplete one. It has also been found out that red phosphorus can be manufactured by dissolving white phosphorus in a suitable solvent. These processes have, however, so many disadvantages that the same could never be practically used. First of all, the reaction in solvents which easily take up the white phosphorus (as, for instance, bisulfid of carbon, naphtaline, or the like) goes on so slowly that an enormous time is necessary for obtaining very small quantities of red phosphorus. If the reaction shall be accelerated by the addition of catalytically-acting compounds—as, for instance, iodin or iodid of phosphorus or similar materials—small quantities of white phosphorus can be easily transferred into red phosphorus; but the reaction ceases very soon, as the solution gets very quickly poor in catalytically-acting compounds. This results from the depositing red phosphorus carrying along a great quantity of these catalytically-acting compounds, so that the solution gets easily poor in such compounds. These disadvantages are done away with by the object of the present invention by causing the reaction to take place in a solvent which possesses besides its capability of easily taking up the white phosphorus the properties of a catalytically-acting compound. These two properties are united, for instance, in molten iodid of phosphorus, molten sesquisulfid of phosphorus, and in tribromid of phosphorus. Though part of the solvent may be carried along with the deposit of red phosphorus, the catalytic properties of the remaining solvent will always be constant, so that the reaction can be completely carried through and is not interrupted before the completion. Special advantages are attained by such solvents, which possess at the same time a high specific weight which surpasses considerably the weight of the depositing product, as in this case the product of the reaction swims always at the surface of the liquid and remains in a very finely divided-up state. In all the solvents the specific weight of which is smaller than the weight of the deposit this deposit will always be situated at the bottom of the receptacle in which the heating takes place. In the latter case an overheating of the deposit and slagging of the same can scarcely be prevented. The transformation of the phosphorus in solvents, which at the same time act catalytically, represents an enormous progress in technics. Though the reaction may be reversed and results in a chemical equilibrium, the formation of the red amorphous phosphorus goes on so far that it can practically be considered as a complete transformation. Very small quantities of white phosphorus may remain in the solvent, but the obtained product (red phosphorus) is perfectly free of the same, and the small quantities of the white phosphorus contained in the solvent may be removed from the deposit by washing this deposit in suitable liquids. It is very easy to remove the whole phosphorus so completely that even by the very sensible reaction "Mitscherlich" not the smallest quantities of white phosphorus can be found in the product. Even in case the white phosphorus originally used contained small quantities of arsenic the product of the reaction is perfectly free of these poisonous substances. The product of the reaction differs considerably from the ordinary amorphous phosphorus to be found in the trade. They have an orange or light-red color, are very finely divided up, and possess in consequence hereof a very considerable capability of reacting. So, for instance, they easily dissolve in diluted alkalies (when the same are heated to a low degree) under the violent development of not self-igniting hydrogen phosphide. In diluted nitric acid the products dissolve already in a cold state, and if the same are brought into a solution of sulfate of copper, metallic copper or phosphide of copper is separated. Also organic colors—as, for instance, indigo—can be discolored by boiling a watery solution of the same with the red phosphorus obtained by this reaction. Very characteristic is the reaction taking place with diluted alkalies, especially with ammonia in a cold state. By this reaction immediately a brown color, or in case of using ammonia, even a black color arrives. The light red phosphorus can easily be regenerated from these dark products by heating the same either alone or under water or acids, hereby deliberating small quantities of hydrogen phosphide. A white phosphorus cannot be found in the same, even when using the reaction "Mitscherlich." It has been further found out that the red phosphorus manufactured by means of this process takes up during its formation other substances—as, for instance, sulfids of non-metallic elements contained in the solvents and unites with the same to products which must be considered as compact solutions.

The above-mentioned qualities of the light red phosphorus are not influenced at all by the other substances being dissolved in the same.

In order to make our invention more clear, reference is made to the following examples:

Example I: Ten pounds of white phosphorus and one hundred pounds of iodid of phosphorus are heated for about ten hours to a temperature of about 150° centigrade. The obtained product is separated from the liquid by filtering the same and is then washed out by means of tetra-chlorid of carbon.

Example II: Ten pounds of phosphorus, one-half pound of sulfur, and one hundred pounds of tribromid of phosphorus are heated about ten hours in a receptacle provided with a backflow refrigeratory to about 200° centigrade and are then treated in the same way as in the first example.

The manufacture of the light red phosphorus is perfectly harmless and the process can be carried out with any convenient quantity of phosphorus.

The amorphous phosphorus as prepared and manufactured according to the foregoing-described process may be called "bright red phosphorus" for distinguishing the same from the usual amorphous phosphorus.

Having thus fully described the nature of our invention, what we desire to secure by Letters Patent of the United States is—

1. Process of manufacturing bright red phosphorus, consisting in adding white phosphorus free from all inert and diluting solvents to such compounds, which have simultaneously the properties of good solvents for white phosphorus and the properties of catalytically-acting bodies, and then heating the mixture, for the purpose as described.

2. Process of manufacturing bright red phosphorus, which consists in dissolving white phosphorus in tribromid of phosphorus free from all inert diluting solvent, and then in heating the mixture, for the purpose as described.

In testimony whereof we have signed our names to this specification in the presence of two subscribing witnesses.

RUDOLF SCHENCK.
PAUL MARQUART.

Witnesses:
WILHELM SCHLEMMING,
ARTHUR SCHULZ.